Feb. 25, 1964 R. Z. PAGE 3,122,602
CHROMATIC MICROSCOPE ILLUMINATION DEVICE
Filed Feb. 24, 1959 2 Sheets-Sheet 1

Robert Zane Page
INVENTOR

BY
L.L. Shrago

Feb. 25, 1964   R. Z. PAGE   3,122,602
CHROMATIC MICROSCOPE ILLUMINATION DEVICE
Filed Feb. 24, 1959   2 Sheets-Sheet 2
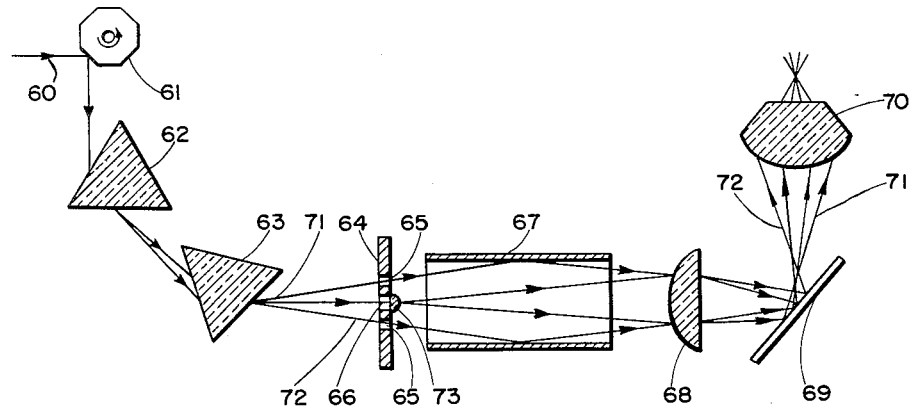
Fig. 6
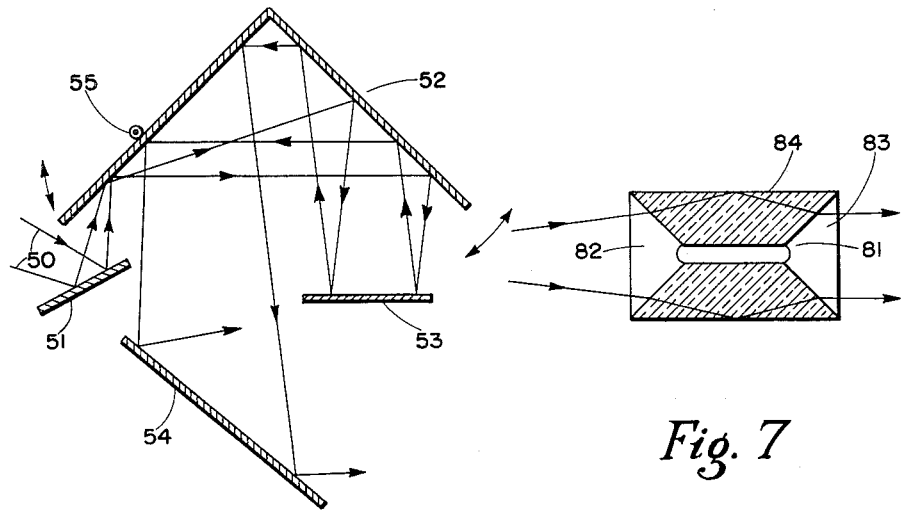
Fig. 5
Fig. 7
Robert Zane Page
INVENTOR.
BY 3,122,602
CHROMATIC MICROSCOPE ILLUMINATION DEVICE
Robert Zane Page, 7117 Kerr Drive, Springfield, Va.
Filed Feb. 24, 1959, Ser. No. 795,300
6 Claims. (Cl. 88—40)
(Granted under Title 35, U.S. Code (1952), sec. 266)

The invention described herein may be manufactured and used by or for the Government of the United States of America for governmental purposes without the payment of any royalties thereon or therefor.

The present invention relates generally to optical instruments and more particularly to apparatus for and methods of light-staining bacteriological and biological specimens and the like for facilitating their microscopic examination.

Recently developed light-staining techniques have, as is well known, substantially eliminated the need for chemically staining bacteriological and biological specimens undergoing microscopic investigation so that it is now possible for microorganisms, plants and animal tissues, for example, to be observed microscopically under nearly natural or intentionally altered conditions. For the most part, however, the prior art systems for achieving this mode of illumination require complex and costly microscope accessories whose critical adjustment and relatively inflexible optical geometry preclude their employment with conventional clinical equipment. Furthermore, the range of colors available for staining is usually considerably less than one-half the visual spectrum. This limited color selectivity prevents the viewer from obtaining optimum contrast and thus the best possible resolution of the fine structural details of the specimen is oftentimes never realized.

It is, accordingly, a primary object of the present invention to provide an illumination system which will serve the purpose of and obviate the need for chemical staining of specimens undergoing microscopic examination.

Another object of the present invention is to provide an arrangement for improving the illumination of living microorganisms and the like wherein their fine, microscopic, structural details are made available to the viewer.

A further object of the present invention is to provide a versatile microscopic illumination system which eliminates the necessity for staining, destaining or counterstaining specimens under examination.

A still further object of the present invention is to provide a lighting system for a microscope wherein the object under examination can be illuminated with annular, oblique, monochromatic light of any specific frequency.

A still further object of the present invention is to provide apparatus for illuminating a microscope with oblique, monochromatic lights of any desired color with a dark field.

A still further object of the present invention is to provide a microscope with field illuminaton of any desired color.

A still further object of the present invention is to provide a relatively simple arrangement for illuminating a microscope with oblique, monochromatic light of any color with a field of constantly contrasting color.

A still further object of the present invention is to provide a simple system for illuminating a microscope with any color in the visual spectrum.

A still further object of the present invention is to provide apparatus for automatically scanning a specimen under microscopic examination with a full light spectrum.

Other objects and many of the attendant advantages of this invention will be readily appreciated as the same becomes better understood by reference to the following detailed description when considered in connection with the accompanying drawings wherein:

FIG. 5 is a cross-sectional view of still another optical system for carrying out the same function as that performed by the systems of FIGS. 3 and 4;

FIG. 6 is a diagrammatic view of an optical system arranged in accordance with a second embodiment of the invention; and FIG. 7 is a cross-sectional view of a component suitable for employment in a system of the type illustrated in FIG. 6.

Figure 1:
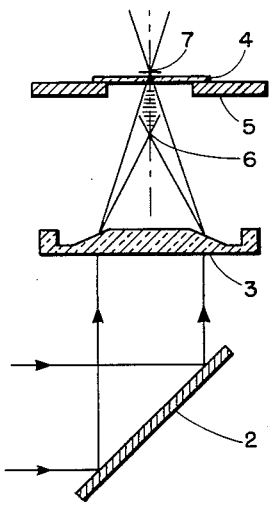
FIG. 1 is a diagrammatic view of an optical system incorporating one embodiment of the invention.

Referring now to FIG. 1, a thin ring of light, represented schematically by boundary rays 1 and derived from any suitable light source, is directed onto an angularly orientated mirror 2 and reflected upwardly through an optical member 3 having the geometrical configuration of a truncated cone. This component has the optical properties of a circular prism and transforms the incident ring of light into a series of concentric, converging, hollow cones of light covering the spectrum. Thus, the red rays of light at the low frequency end of the spectrum come to a focus at point 7, while the violet rays on the other end of the spectrum focus at lower point 6. The optical axis of component 3 is made to coincide with that of the microscope and the arrangement of FIG. 1 serves as a substitute for the conventional substage condenser for illuminating object 7 mounted on, for example, a transparent plate 4 supported from stage member 5.

It will thus be seen that when prismatic member 3 is moved vertically, such as by any conventional rack-and-pinion arrangement, not shown, object 7 will be illuminated in turn by the entire visual spectrum. The particular frequency at any one point will depend, of course, upon the diameter of the light ring impinging upon the prism, the angle of this prism and the latter's separation from the object. In the particular case illustrated, upward movement will result in the object being exposed first to the red end of the spectrum and finally to the violent end.

Since each of the above different colors impinges on the object as converging, hollow cones of light, an annular, oblique, symmetrical mode of illumination is achieved. If the obliquity of the colors in the low frequency portion of the spectrum is such that no direct rays are included within the angular cone of the objective lens of the microscope, then, as is well known, the illumination is of the dark field type. Since the angle of obliquity of the rays at the high end of the spectrum is always greater than those just mentioned, it follows that if the low frequency rays do not enter the objective the high frequency rays are also precluded from doing so.

It is, however, possible that with a given optical geometry at some point in the vertical movement of prismatic member 3 the obliquity of the illuminating rays will be such that they fall within the angular cone of the objective lens of the microscope. When this occurs, a concentric ring of light will appear about the center of the field of vision. In other words, the situation can occur where the rays of one particular color focus on the object and are not focused by the microscope's objective lens, while the rays of a different color at perhaps a slightly lower frequency will not focus on the object but will, however, enter the objective lens. Thus, the object will be subjected to dark field illumination with one color and the image focused by the objective lens and the eyepiece will be enclosed by a concentric ring of a different color. Because of the geometrical optics of the system of FIG. 1, the high frequency colors will usually provide dark field illumination, whereas the low frequency colors will contribute the contrasting field. It will be recognized that the numerical aperture of the objective lens also governs the type of illumination experienced.

Figure 2:
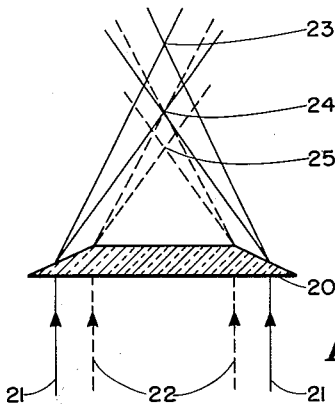
FIG. 2 is a cross-sectional view of an optical component suitable for use in the system of FIG. 1.

The production of a contrasting field for the entire spectrum requires that a second ring of light be available to produce a second complete spectrum. An arrangement for producing these spectra is illustrated in FIG. 2 where light rays 21 of an outer ring produce a first visual spectrum between focal limits 23 and 24, while light rays 22 from an inner ring produce a second visual spectrum between focal limits 24 and 25. By altering the diameter of the outer ring, for example, and controlling the vertical disposition of prism 20 with respect to the objective lens, it is possible to achieve dark field illumination with any color of the second spectrum and contrasting field illumination with any color of the first spectrum. In this connection, it would be noted that it is preferable to resort to the spectrum falling within points 24 and 25 for dark field illumination because of the greater angle of obliquity of its constituent color rays. The latter angular relationship occurs because the rays from the inner ring suffer more dispersal from the conical prism 20 as a consequence of their longer transmission paths.

Figure 3:
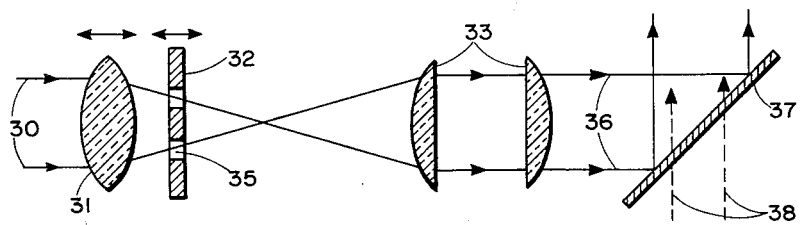
FIG. 3 is a cross-sectional view of an optical system for changing the dimensional characteristic of the light source of FIG. 1.

FIG. 3 illustrates one simple arrangement for varying the diameter of one of the light rings illuminating prism 20 of FIG. 2. Here, a solid beam of light 30 of arbitrary diameter is transformed into a hollow, diverging cone of light by a double, convex lens 31 and a screen 32 having an annular, transparent portion 35. After coming to a focus, the diverging cone of light is converted into a hollow cylinder by a pair of plano-convex lenses 33. Thereafter, it impinges upon the reflecting surface of an angularly disposed mirror 37, which component is the counterpart of mirror 2 of FIG. 1. It will be obvious that the diameter of light ring 36 can be readily altered by changing the horizontal separation between lens 31 and screen 32.

If it is desired to change the diameter of only one of the light rings without disturbing the dimensions of the other, mirror 37 in FIG. 3 can be of the half-silvered type. With such a characteristic, light ring 36 would then be reflected from the upper surface while light ring 38 would impinge upon the bottom surface, pass upwardly through the mirror and then be propagated in the same direction as the aforementioned reflected light.

Figure 4:
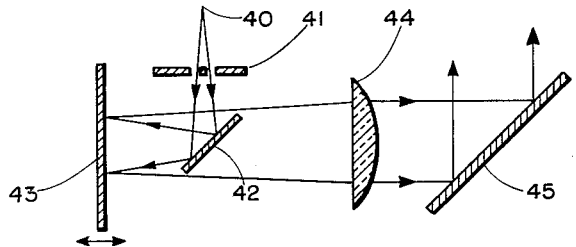
FIG. 4 is a cross-sectional view of another optical system for achieving the same effect.

FIG. 4 shows another arrangement for varying the diameter of one of the light rings, wherein diverging light from a point source 40 is initially formed into a hollow light cone by the circular aperture of screen 41, then reflected from an angularly disposed planar mirror 42 and a vertical mirror 43. After this double reflection, the diverging light cone is formed into a cylinder of light by plano-convex lens 44. Since the diameter of the light cylinder emerging from lens 44 depends to one extent upon the total length of the light path from source 40 to the planar side of this lens, this dimension may be varied by changing the relative horizontal position of vertical mirror 43. Movement to the left as viewed in FIG. 4, of course increases the path length and gives a larger light ring, while movement to the right gives the opposite effect.

In FIG. 5 there is shown an alternative arrangement for changing the diameter of the light ring, where the only adjustment involves the angular rotation of a right-angled mirror 52 about pivotal point 55. In this case, a converging, hollow cone of light 50 falls upon an inclined mirror 51 and is reflected in turn from this mirror, the left and right sides of the right-angled mirror, respectively, horizontal mirror 53, the right and left sides of the right-angled mirror, and finally from inclined mirror 54. Here, too, the convergence of the final beam and the size of a ring section thereof is directly proportional to the total length of the light path from mirror 51 to mirror 54, and this dimension may readily be controlled by altering the angular disposition of right-angled mirror 52 with respect to stationary mirror 51.

In FIG. 6 there is schematically illustrated a second embodiment of the present invention. In this alternative arrangement, a band of light 60 is reflected from multisided mirror 61 and then dispersed by a pair of prisms 62 and 63 whose deviations add to produce a spectrum of expanded length. The spectral light emerging from prism 63 illuminates screen 64 having two parallel slots 65 and the transmitted light passes via cylinder 67 and focusing lens 68 to the substage mirror 69 of a conventional condenser having as one of its converging optical members lens 70.

Depending upon the spatial disposition of prism 63, screen 64 and cylinder 67, only those light rays, such as for example 71 and 72, having a particular angular separation can pass through slots 65, reach the inner wall of cylinder 67 and emerge from the other end of the cylinder. Because of the circular nature of the wall surface from which these light rays are reflected, the beam made up of these reflected rays has an arcuated configuration. By regulating the position of focusing lens 68, these arcs can be made to fall just within the periphery of lens 70 to provide oblique lighting for the object located at the focal point of the condenser.

As multisided mirror 61 is rotated about its central axis, it will be appreciated, the spectral band of light emerging from prism 63 now sweeps across screen 64. As this scanning operation takes place, a succession of different colors will illuminate the above object.

In order to provide a contrasting field, screen 64 is designed with a central aperture 66 which is aligned with the longitudinal axis of cylinder 67. Because of this aperture, rays of a color midway between the frequencies of rays 71 and 72 can reach spot lens 73 and form a diverging, solid cone of light. This light is also focused by lens 68 and directed via mirror 69 onto the central portion of the lower surface of lens 70, thereby adding a contrasting field type of illumination for the object.

Here it would be pointed out that optical screen 64 is not functionally essential to the operation of the system but its presence is desirable since it simplifies the problem of aligning cylinder 67 and spot lens 73 with prism 63. This screen, moreover, may be made to serve as a mounting means for the above lens.

In the case where it is desired to scan the object under microscopic examination with the whole range of the spectrum, mirror 61 can be caused to rotate at a given angular velocity by any conventional drive means. This mode of operation lends itself to the field of photomicroscopy, and the rate at which the colors change can be made to equal the film exposure time. It will be recognized that the types of illumination realized with the apparatus of FIG. 1 can be effectively duplicated with the arrangement of FIG. 6 by changing the size and location of the arcs and the cone of light striking the lower surface of lens 70.

For cytological study, it is usually desirable to screen out the central field illumination and produce a dark field effect. This mode of operation can be obtained by employing a suitable optical screen having only a transparent, annular aperture. Where only a color field without oblique light is desired, an optical screen may be used to block out all light except that entering the spot lens. Also, depending upon the type and location of the spot lens 73 and focusing lens 68, a diffusing plate may be incorporated to soften the brilliancy of this field color at low magnification.

It will be understood that as multisided mirror 61 rotates there will be times during its cycle where one of the extreme light rays, for example 72, will be in the invisible part of the spectrum and the object will then be illuminated by only one visible arc. It has been found that by moving component 64 to the right away from prism 63 one can use less contrast between the oblique and transmitted light and that the two different arcs of different color will illuminate the object through more of a total angular swing of any particular side of mirror 61. Also, moving screen 64 to the left will give more contrast and permit only one arc to be used at a single time.

It should also be appreciated that, if desired, the hollow cylinder 67 may be illuminated by concentric, diverging cones of different colored light obtained from a circular prism having a configuration similar to that used in FIG. 1. Furthermore, it has been found that the performance of the system of FIG. 6 is improved by the inclusion of a polarizing screen in front of the multisided mirror 61 for permitting the incident light to be polarized in any selected direction. Also, where it is desirable to procure different types of object illumination with white light, prisms 62 and 63 may be removed out of the optical train and, for example, an inclined mirror and a cylindrical lens inserted in their place.

It should also be understood that the orientation of the constituent components of FIG. 6 may be changed from that shown and, for example, lens 68, cylinder 67 and screen 64 placed in vertical alignment along the optical axis of symmetry of the condensing lens 70. This arrangement recommends itself where space-saving considerations are important.

To simplify the construction of the apparatus of FIG. 6, cylinder 67 may be replaced with a clear, plastic rod having a central aperture 81 throughout its length and a pair of inverted cones 82 and 83 cut in opposite ends thereof, as illustrated in FIG. 7. The operation of the system with this element is essentially the same as with the reflecting cylinder, the outer surface of the plastic 84 providing the reflection and the plastic adjacent to the inverted cones acting prismatically.

Obviously many modifications and variations of the present invention are possible in the light of the above teachings. It is therefore to be understood that within the scope of the appended claims the invention may be practiced otherwise than as specifically described.

What is claimed is:

1. A lighting arrangement for use with a microscope of the type containing a substage condenser comprising, in combination, means for producing a diverging spectrum of light bands, said light bands being symmetrically disposed about a first direction, a hollow cylinder having its inner wall highly reflective and its longitudinal axis coincidental with said first direction, said hollow cylinder being in a position such as to have one of its ends illuminated with said bands of light, screening means for permitting only two of said bands of light which have a given angular relationship with respect to said first direction to enter said cylinder and be internally reflected from its inner wall, and emerge as arcs of light, means for directing said arcs of light upon opposite peripheral portions of the lower lens of said substage condenser, and means for altering the angular relationship between said first direction and the longitudinal axis of said cylinder whereby the wave length of said two bands of light which enter said cylinder changes.

2. A lighting system for use with a microscope having a substage condensing lens comprising, in combination, a tubular member having its inner wall surface light reflective, means for illuminating one end of said member with a visible spectrum, the component light waves of which diverge in space, the diameter of said tubular member and the divergence of said light waves being such that only those light waves which fall within a particular portion of said spectrum enter one end of said tubular member, suffer a reflection from the inner wall surface thereof and emerge from the other end of said tubular member, means for transforming said emerging waves into diverging waves, said substage condensing lens being positioned in the path of said diverging waves whereby an object located at the focus of said condensing lens is illuminated simultaneously with oblique light of different colors.

3. A lighting arrangement for use with a microscope of the type having a substage condenser comprising, in combination, a light source in the form of a visible spectrum the component light waves of which diverge in space from a given point, a tubular member having its inner wall surface reflective, the longitudinal axis of said tubular member passing through said point whereby predetermined component light waves of said spectrum enter one end of said tubular member are internally reflected from the inner wall surface thereof and emerge in arcs of light of different color, means for directing said arcs of light upon opposite peripheral portions of the lower condensing lens of said substage condenser whereby an object located at the focus of said condensing lens is illuminated with oblique light of different colors, the separation between said point and said tubular member being variable whereby the frequency of the emerging arcs of light can be altered.

4. In an arrangement as defined in claim 3, a screen interposed between said point and said tubular member, said screen having an annular opening to allow only selected component waves of said spectrum to enter said tubular member.

5. A lighting arrangement for use with a microscope of the type having a substage condenser comprising, in combination, a light source in the form of a visible spectrum, the component waves of said spectrum originating from a given reference point and diverging about a given reference direction, a tubular member having its inner wall surface light reflective, said given reference point being located adjacent one end of said tubular member and on the longitudinal axis of said tubular member, means for changing the direction about which said component waves diverge whereby different component waves of said spectrum enter said one end of said tubular member, are internally reflected from the wall surfaces thereof and emerge from the other end of said tubular member, and means for directing onto the lower condensing lens of said substage condenser those component waves of said spectrum which emerge from said other end of said tubular member whereby an object located at the foci of said substage condenser is successively illuminated with oblique light of different colors.

6. In an arrangement as defined in claim 5 wherein said tubular member is displaceable with respect to said point so as to change the component waves of said spectrum which enter said tubular member.

References Cited in the file of this patent

UNITED STATES PATENTS

| | | |
|---|---|---|
| 1,202,223 | Redfield | Oct. 24, 1916 |
| 1,458,826 | Janovjak | June 12, 1923 |
| 1,724,527 | Spierer | Aug. 13, 1929 |
| 1,792,046 | Skaupy | Feb. 10, 1931 |
| 2,105,671 | Roesch | Jan. 18, 1938 |
| 2,235,460 | Mestre | Mar. 18, 1941 |
| 2,594,757 | Fischer | Apr. 29, 1952 |
| 2,687,670 | Locquin | Aug. 31, 1954 |
| 2,722,863 | Heine | Nov. 8, 1955 |
| 2,835,167 | Pierce | May 20, 1958 |

FOREIGN PATENTS

| | | |
|---|---|---|
| 98,827 | Switzerland | Apr. 16, 1923 |
| 100,630 | Switzerland | Aug. 1, 1923 |